US009626449B2

(12) United States Patent
Sharp et al.

(10) Patent No.: US 9,626,449 B2
(45) Date of Patent: *Apr. 18, 2017

(54) STAGING ELECTRONIC PUBLICATIONS

(71) Applicant: Apple Inc., Cupertino, CA (US)

(72) Inventors: Christopher Brooke Sharp, San Jose, CA (US); John S. Baumgarten, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,144

(22) Filed: Jan. 30, 2015

(65) Prior Publication Data

US 2015/0193456 A1    Jul. 9, 2015

Related U.S. Application Data

(63) Continuation of application No. 12/187,111, filed on Aug. 6, 2008, now Pat. No. 8,949,564.

(60) Provisional application No. 60/954,216, filed on Aug. 6, 2007.

(51) Int. Cl.
*G06F 12/14* (2006.01)
*G06F 3/06* (2006.01)
*G06F 17/30* (2006.01)

(52) U.S. Cl.
CPC .......... *G06F 17/3089* (2013.01); *G06F 3/065* (2013.01); *G06F 3/067* (2013.01); *G06F 3/0619* (2013.01); *G06F 3/0647* (2013.01); *G06F 12/1425* (2013.01)

(58) Field of Classification Search
CPC .. G06F 12/1425; G06F 3/0619; G06F 3/0647; G06F 3/065; G06F 3/067; G06F 17/3089
See application file for complete search history.

(56) References Cited

U.S. PATENT DOCUMENTS

| 6,505,212 | B2 | 1/2003 | Nakano et al. |
| 6,538,635 | B1 | 3/2003 | Ringot |
| 6,578,015 | B1 * | 6/2003 | Haseltine et al. ............. 705/34 |
| 6,633,877 | B1 | 10/2003 | Saigh et al. |
| 7,895,311 | B1 | 2/2011 | Juenger |
| 8,625,607 | B2 | 1/2014 | Rieger et al. |
| 8,949,564 | B2 | 2/2015 | Sharp et al. |
| 2001/0011265 | A1 | 8/2001 | Guan et al. |
| 2001/0018728 | A1 | 8/2001 | Topham et al. |

(Continued)

FOREIGN PATENT DOCUMENTS

EP          1128267          8/2001

*Primary Examiner* — Aracelis Ruiz
(74) *Attorney, Agent, or Firm* — Fish & Richardson P.C.

(57) ABSTRACT

A system includes storage devices for storing content along with two or more computing devices such as two or more servers. One of the computing devices includes a staging memory that stores content that is received from the storage devices. The computing device also includes a user memory that is assigned to a user and stores content transferred from the staging memory. The user memory is accessible by the user while the staging memory is inaccessible by the user. The system also includes another computing device that has a content manager that initiates transferring of content from the storage devices to the staging memory and transferring content from the staging memory to the user memory for electronic publication of the content.

45 Claims, 4 Drawing Sheets

(56) References Cited

U.S. PATENT DOCUMENTS

| | | | |
|---|---|---|---|
| 2001/0037475 A1* | 11/2001 | Bradshaw et al. | 714/15 |
| 2004/0091114 A1 | 5/2004 | Carter et al. | |
| 2005/0246752 A1* | 11/2005 | Liwerant | G06Q 30/02 725/109 |
| 2007/0180135 A1* | 8/2007 | Kenrick | H04L 29/06027 709/231 |
| 2007/0282893 A1* | 12/2007 | Smith et al. | 707/102 |
| 2007/0289022 A1* | 12/2007 | Wittkotter | H04L 63/123 726/27 |
| 2008/0001723 A1 | 1/2008 | Schuessler | |

* cited by examiner

STAGING ELECTRONIC PUBLICATIONS

CROSS REFERENCE TO RELATED APPLICATIONS

This application is a continuation (and claims the benefit of priority under 35 USC 120) of U.S. application Ser. No. 12/187,111, filed Aug. 6, 2008, now U.S. Pat. No. 8,949,564, which claims priority to U.S. Provisional Application No. 60/954,216 filed Aug. 6, 2007. Both of these prior applications are incorporated by reference in their entirety.

BACKGROUND

This disclosure relates to staging content from one or more resources in preparation for electronically publishing the content.

Electronic publications such as web pages and websites may include various types of multi-media content such as text, graphics, audio and video. Along with publications for commercial entities, web pages may be created and published with information relating to individuals. Resources such as large data depositories may be accessed with various types of communication links and provide the multi-media content for constructing the electronic publications. Bandwidth, transmission rate and link capacity variations of the communication links, along with associated hardware, may cause delays in accessing and retrieving the content, and thereby, delay construction of the electronic publications.

SUMMARY

Disclosed herein are systems and methods for staging the collection and publishing of electronic publications such as web pages and web sites. In some implementations a system includes storage devices for storing content along with two or more computing devices such as two or more servers. One of the computing devices includes a staging memory that stores content that is received from the storage devices. The computing device also includes a user memory that is assigned to a user and stores content transferred from the staging memory. The user memory is accessible by the user while the staging memory is inaccessible by the user. The system also includes another computing device that has a content manager that initiates transferring of content from the storage devices to the staging memory and transferring content from the staging memory to the user memory for electronic publication of the content.

In some implementations, the content manager may be configured to initiate updating of the content stored in the user memory. The content manager may also be configured to block updating of content stored in the staging memory. Other operations of the content manager may include comparing the content stored in the staging memory to the content stored in the user memory. Based upon the comparison, the content manager may update the content of the user memory.

In other implementations, one or more computer readable media store instructions that are executable by a processing device. Upon such execution, the processing device performs operations that include storing content in a staging memory of a storage device that is separate from a user memory also of the storage device. The user memory is assigned to a user and the staging memory is inaccessible by users. Operations also include transferring the content from the staging memory to the user memory for electronic publication of the content.

In other implementations, an apparatus includes a computing device that has a user memory that is assigned to a user and stores content for publishing electronic publications. The computing device includes a staging memory, separate from the user memory, which is inaccessible by users. The computing device also includes a content manager for transferring the content from the staging memory to the user memory for electronic publication of the content.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
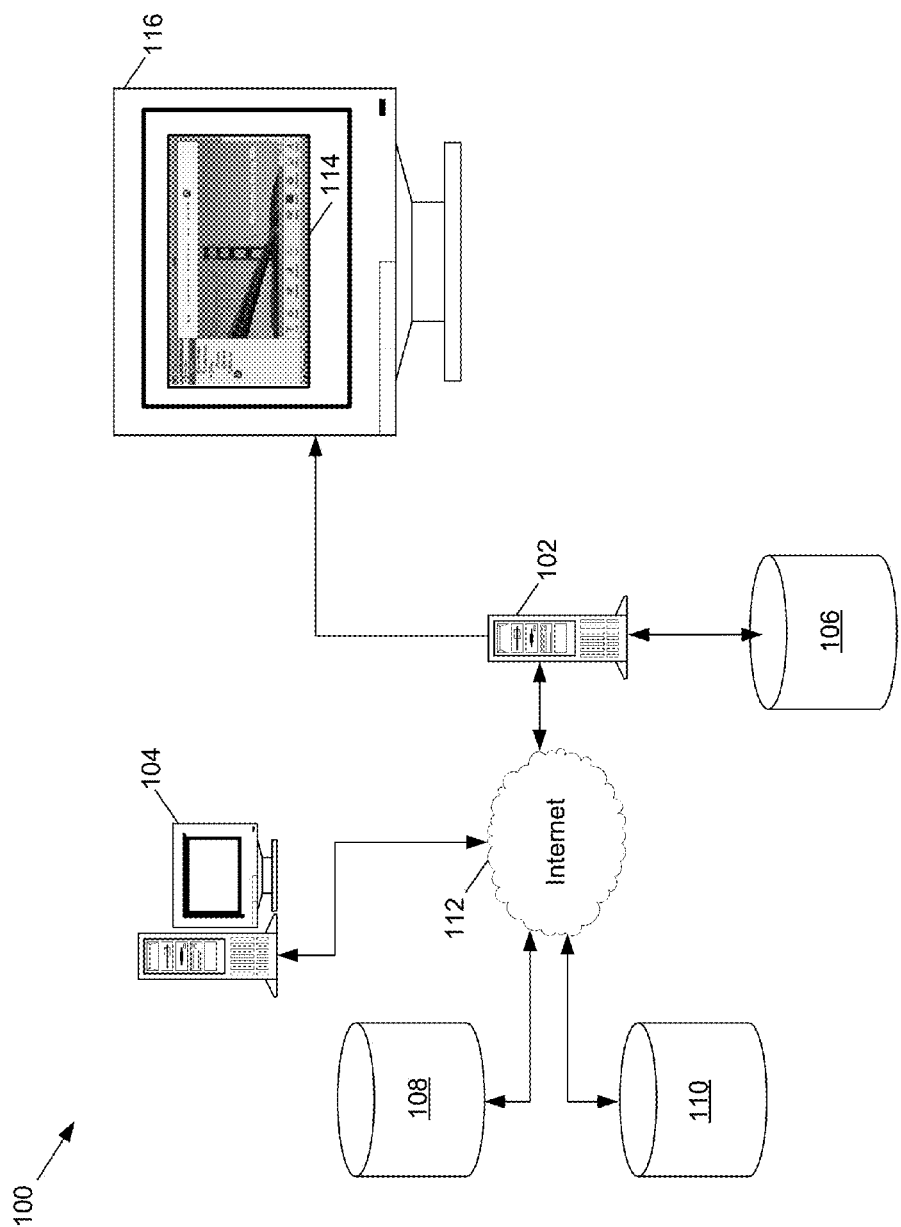
FIG. 1 is a block diagram of a computer network.

Referring to FIG. 1, a computer network 100 includes a computer system 102 that may be used to construct electronic publications such as web pages and websites from various types of multi-media content. For example the computer system 102 may collect text, graphics, audio, video and other types of content for inclusion in one or more electronic publications that may be accessed by way of the computer system 102 or other computing devices such as another computer system 104, cellular telephones (not shown), personal digital assistants (not shown), and the like.

To construct the electronic publications, the computer system 102 may access various data depositories such as local or remotely located storage devices (e.g., hard drives, CD-ROM, redundant array of independent disks (RAIDs), etc.) such as a local storage device 106 and remote storage devices 108 and 110, which are directly or indirectly in communication with the computer system. For example, a direct hardwire or wireless connection (e.g., a Universal Serial Bus (USB) connection, infrared connection, etc.) may be used to connect the computer system 102 to the storage device 106. Indirect communications may be provided by network connections such as via the Internet 112 for accessing and retrieving content from remotely located storage devices 108 and 110.

In this arrangement, a webpage 114 is produced and published by the computer system 102 (and displayed on a monitor 116) by collecting multi-media content from storage units such as the storage units 106, 108, 110. Due to practical bandwidth and transmission rate limitations, the content collection may be a relatively time consuming process. For example, due to latency of connections within the Internet 112, the content collected from the directly connected storage unit 106 may arrive at the computer system 102 in advance of the content from the remotely located storage devices 108 and 110. Due to such latency, combining the collected content and constructing electronic publications such as the webpage 114 may be delayed. Furthermore, to update content previously collected and currently displayed (e.g., in webpage 114), additional delays may be incurred and thereby delay updating of the electronic publication. Malfunctioning of the computer system 102 may also effect the status of the webpage 114. For example, publication of the web page 114 maybe temporarily (or permanently) halted if the computer system 102 malfunctions and the webpage 114 may need to be completely reconstructed when the computer system is returned to a properly functioning state.

Figure 2:
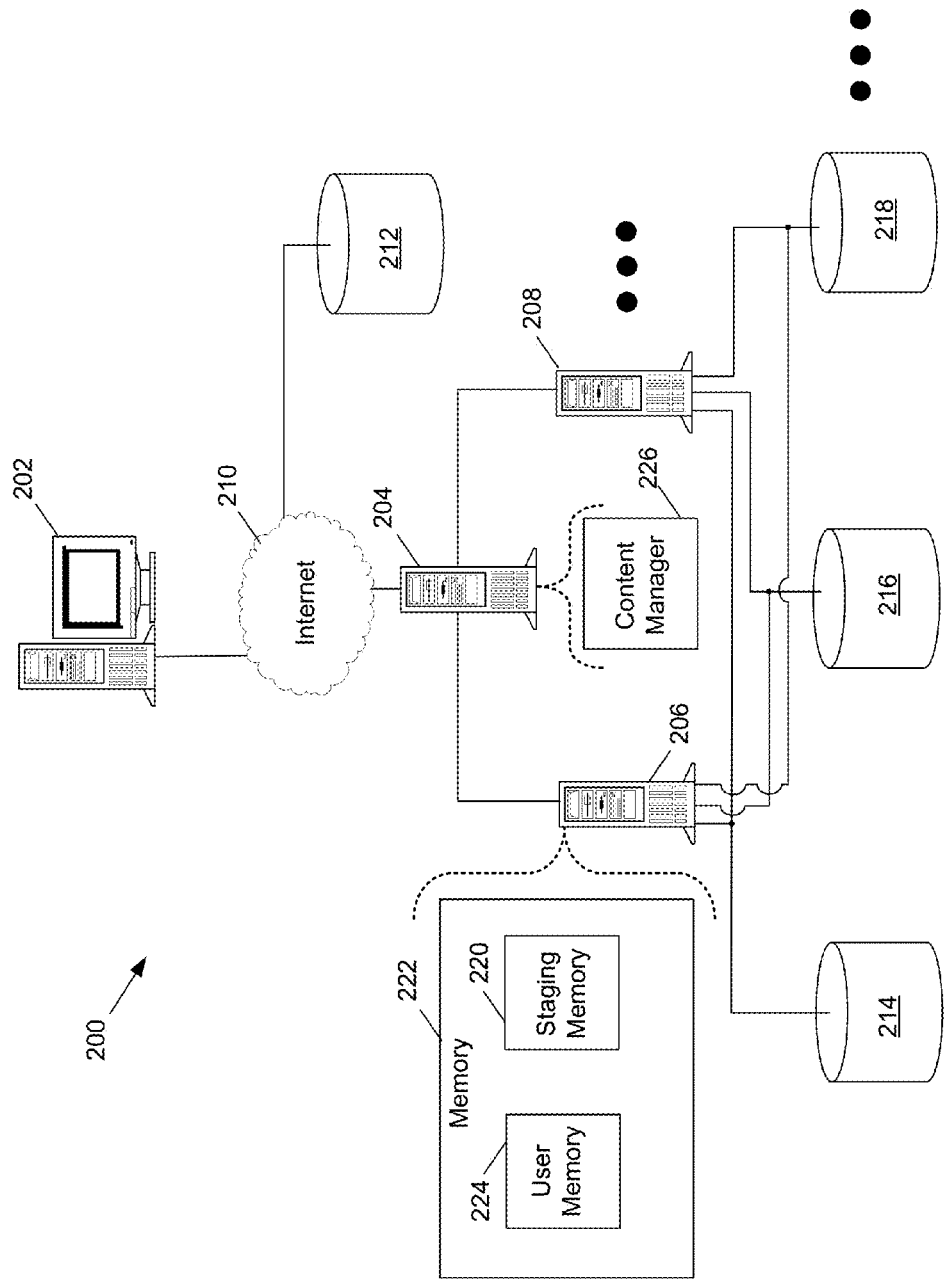
FIG. 2 is a block diagram of an electronic publication system.

Referring to FIG. 2, a web publication system 200 produces and updates electronic publications in stages to reduce the affects of collection delay due to connection latency, bandwidth limitations, etc. By dedicating memory as a staging area, content may be collected and transferred to another memory once prepared for publication. As such, delays that may be experienced in collecting and storing content in the staging area may not be substantially felt once the content is transferred to the memory for publication. Additionally, electronic publication content may be updated relatively quickly and in an efficient manner by first assembling the content in the staging area. For example, an electronic publication of a person's resume may be updated by adding new content (e.g., updated photographs and recent employment information) while retaining unchanged content (e.g., educational information).

To provide content staging and updating functionality, the web publication system 200 includes a computer system 202 that may be used to initiate and direct creation and publishing of electronic publications. A series of servers (represented by servers 204, 206 and 208) allow the publications to be remotely created, managed and maintained to reduce the effects of potential malfunctions of the computer system 202. In some arrangements the servers 206 and 208 may be associated with a commercial entity such that users pay a subscription fee to be allowed access and use of the servers for publication creation and secure data storage. For example, access and use of servers 206 and 208 may be provided in a service package such as the iDisk™ service offered by Apple Inc. of Cupertino, Calif. Along with being provided a pre-defined amount of storage space (e.g., 250 Megabytes), a subscriber may be granted a pre-defined amount of data transfers (e.g., 3 Gigabytes) for a certain time period (e.g., per month). Two servers 206, 208 are represented in this illustration for providing a service package to subscribers; however, the number of servers (or other types of computing devices) may be increased or decreased as needed.

The server 204 may communicate with each of the servers 206, 208 and direct collecting of content for electronic publication construction, updating and corresponding publication. The constructed electronic publications may include various types of multi-media content from one or more sources. For example, the content may be provided from one or more storage devices in communication with the Internet 210 such as a storage device 212. Additionally, storage devices local to the computer system 202 (e.g., a hard drive, CD-ROM, etc.) or local to the servers 204, 206 and 208 may be used to provide content. For example, a series of storage devices represented by three storage devices 214, 216, 218 are in communication with both servers 206, 208 and may provide content for constructing, updating and maintaining the electronic publications.

To reduce the effects of bandwidth limitations and latency of the Internet 210 (along with other connections), the multi-media content is placed in a portion of memory dedicated to constructing publications. In this arrangement, a staging memory 220, which is included in a memory 222 of the server 206, is assigned to collect and prepare content for publication. One more types of memory (e.g., random access memory (RAM), dynamic RAM (DRAM), static RAM (SRAM), etc.) may be used to implement memory 222. The staging memory 220 may be considered separate from the amount of storage space allocated in a subscription, referred to as a user memory 224. Typically, once prepared for publication, the content is transferred from the staging memory 220 to the user memory 224. As such, by collecting and assembling content in advance of publication, bandwidth limitations and latency experienced during collection does not significantly affect the publishing of the content from the user memory 224. For some types of subscriptions, content stored in the staging memory 220 may not be counted as being included in the total memory assigned to a subscriber. For example, subscriptions may provide an amount of predefined memory for the user memory 224, which is independent of the staging memory 220. So while a user is limited to the amount of content that may be stored in the user memory 224, the amount of content stored in the staging memory 220 is not limited by the subscription.

To control collecting and storing content in the staging memory 220 and transferring content from the staging memory to the appropriate user memory 224, a content manager 226 is executed by the server 204. Multiple pairs of staging memory and user memory may be controlled by the content manager 226. For example, one instance of the content manager 226 may control the construction and publishing of electronic publications for a significant number of users. Along with being executed by the server 204, one or more instances of the content manager 226 may be executed at multiple servers (e.g., servers 206 and 208) or execution may be distributed across two or more servers or other type of computing devices.

In this arrangement, a subscriber may not independently access the staging memory 220 to store content separate from the content collected by the content manager 226 for publication. As such, a subscriber may not attempt to use the staging memory to extend his or her memory allotment beyond the assigned user memory 224. Similarly, subscribers assigned to other user memories (not shown) may be blocked from independently accessing corresponding staging memories (not shown).

The staging memory 220 is capable of storing various types of content in preparation for publication. Additionally, one or more data transfer techniques may be implemented for moving content among the storage devices and the memories. For example, content may be transferred from the storage devices (e.g., storage device 214) in segments of a predefined size (e.g., 100 kilo bytes) to the staging memory 220. Segment size may be adjusted (e.g., increased or decreased) based upon the data transmission capabilities (e.g., bandwidth, capacity, etc.) of the storage devices (e.g., storage device 214), the staging memory 220 and interconnections.

While content stored in the storage device 214 may be updated (e.g., amended with new material), the copy of the content stored in the staging memory 220 may be blocked from being updated. By holding content static once stored in staging memory 220, the content may be efficiently transferred to the user memory 224 without substantial delay that may occur if the content is being simultaneously updated. Additionally, in some arrangements, the content manager 226 may monitor the staging memory 220 to determine the time period that content has been stored in the memory. For example, if the content manager 226 determines that the storage time has exceeded a predefined limit (e.g., two days), the content manager may initiate an event such as deleting the stored content that exceeds the time limit.

In this arrangement, unlike the staging memory 220, content stored in the user memory 224 may be updated as the content is updated in a storage device (e.g., storage device 214). For example, a copy of a document stored in the user memory 224 may be updated when text included in the original document (e.g., stored on storage device 214) is updated. Furthermore, in some arrangements, previous versions of updated content may be retained and stored in the user memory 224. Along with being updateable, in this arrangement, updating content stored in the user memory 224 may occur in an automatic fashion (as initiated by the content manager 226) and require little, if any, user input.

For publishing, the stored content is transferred from the staging memory 220 to the separate user memory 224 that is associated with the appropriate user account. Similar to data transmissions between the storage devices and the staging memory 220, content may be transferred in segments of one or more predefined sizes to the staging memory 220. However, in this arrangement, content is provided to the user memory 224 in a single transfer. By transferring the assembled content ready for publication between the staging memory 220 and the user memory 224, data transmission delays due to Internet latency and bandwidth limitations are significantly reduced.

Various types of content transfers may is executed between the staging memory 220 and the user memory 224. For example, content absent from the user memory 224 may be added by transferring the content from the staging memory 220. Content may also be updated by transferring content from the staging memory 220 to the user memory 224. For example, the content manager 226 may initiate a comparison between content stored on the user memory 224 and content slated for transfer from the staging memory 220 to the user memory. Based upon the comparison, the content manager 226 may transfer content (from the staging memory 220) that does not match the content currently in the user memory 224. For example, non-matching content transferred to the user memory 224 may represent content not present on the user memory or an updated version of content already present in the user memory. One or more techniques may be implemented to compare the content of the staging memory 220 to the content of the user memory 224. For example, contents of the staging memory 220 may be overlaid upon the appropriate contents stored in the user memory 224 to identify new or updated content. Along with transferring content from the staging memory 220, other content operations may be executed by the content manager 226. For example, content may be deleted from the user memory 224, for example, if a comparison reveals that content present in the user memory is not present in the staging memory 220.

Upon determining the content to be added, updated, deleted, etc. in the user memory 224, the content manager 226 initiates the execution of one or more operations. For example, a series of operations may be executed to add content, update content and delete content in the user memory 224. As each of the operations are executed, the content manager 226 may monitor the execution for tracking their completion. For example, by monitoring, the content manager 226 may detect when the add, update and delete operations are each completed. The content manager 226 may then log (e.g., in a log file) the completion of each respective operation. If operation execution is interrupted (e.g., due to a malfunction of one or more of the servers), the content manager 226 can detect the last completed operation and thereby identify the next operation to be executed when processing resumes. For example, using the operation series of add content, update content and delete content for illustration, if processing is interrupted after the completion of the add and update operations, the content manager 226 can detect the completion of the add and update operations. The content manager 226, for example, may enter a representation of the executed operations in a log file (e.g., a spreadsheet), delete a representation of each executed operation from a list of operations to be executed or implement other similar techniques. Upon resuming processing, the content manager 226 could relatively quickly identify which operation to execute next based upon the list of executed operations, a list of operations that still need to be executed, etc.

Figure 3:
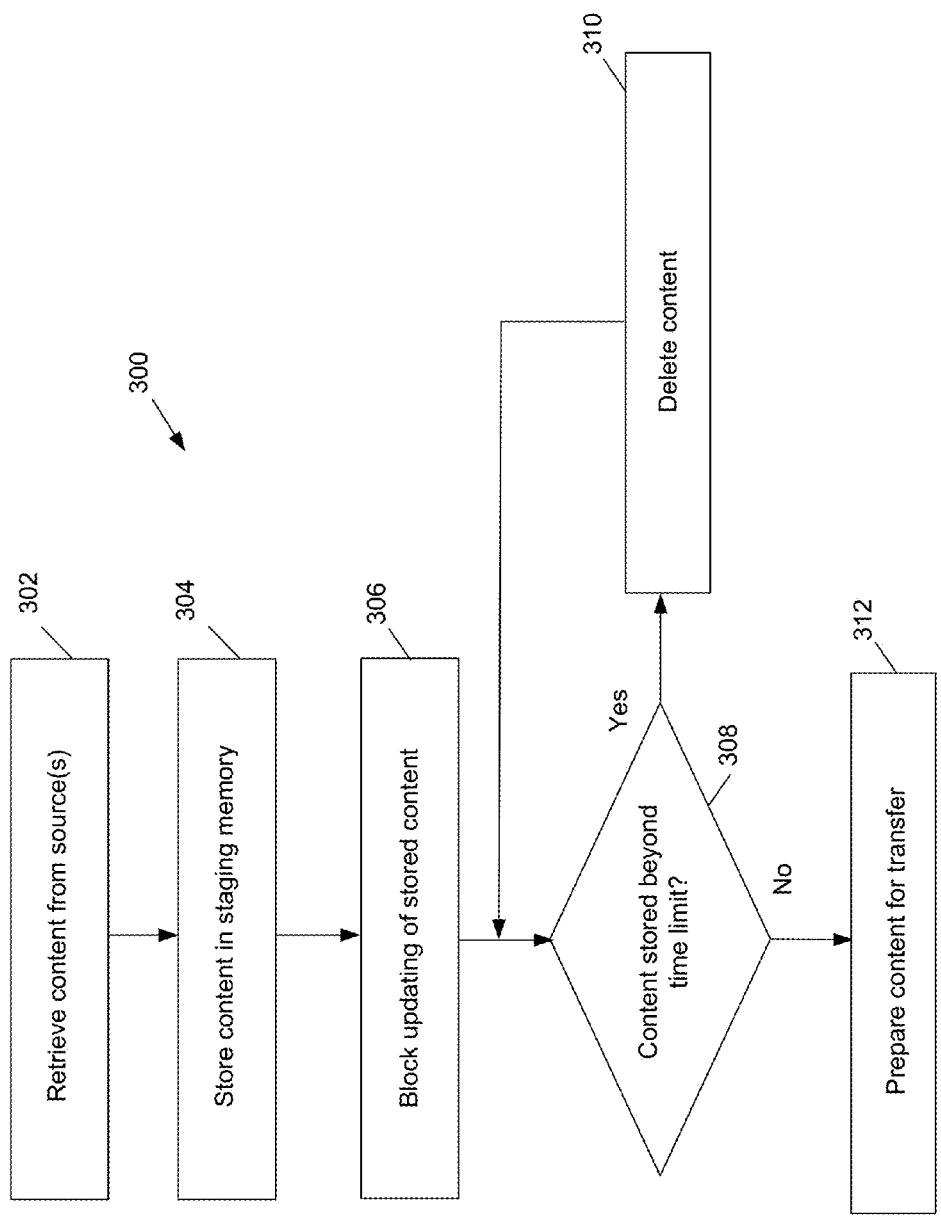
FIGS. 3 and 4 are flow charts of operations of a content manager.

Referring to FIG. 3, a flowchart 300 represents some of the operations of the content manager 226 (shown in FIG. 2). As mentioned above, the content manager 226 may be executed at the server 204, which may be implemented as a server or other type of computation device. Along with being executed at a single site (e.g., server 204), operation execution may be distributed among two or more computation devices. For example, some operations may be executed by two or more servers.

Operations of the content manager 226 include retrieving 302 content from one or more sources such as storage devices (e.g., storage devices 212, 214, 216, 218), servers (e.g., servers 204, 206, 208) or the like. Operations also include storing 304 the retrieved content in a staging memory (e.g., staging memory 220) dedicated to preparing the content for electronic publication. Typically the staging memory is one segment of memory, however, in some arrangements the staging memory may be distributed across multiple memory segments. For example, multiple segments of a memory may be used to define a staging memory or memory segments present in multiple computing devices (e.g., servers) may be combined to form a staging memory.

Operations of the content manager 226 also include blocking 306 the updating of the content stored in the staging memory. Techniques to block updating include removing information from the stored content that may allow updating to occur. Write protection techniques and privilege assignments may also be implemented to block content updates. The content manager 226 may also monitor the amount of time content has been stored in the staging memory and remove the stored content upon reaching a predefined time limit. For example, the content manager may determine 308 if the content has been stored for two days or more. If the time limit has been exceeded, the content manager 226 may delete 310 the stored content from the staging memory. For content stored on the staging memory less than the predefined time limit, the content manager 226 may prepare 312 the content for transfer a separate portion of memory (e.g., a user memory). For example, if the content was retrieved in segments (e.g., 100 kilo byte segments) the content manager 226 may combine the segments to transfer as a single segment or file.

Figure 4:
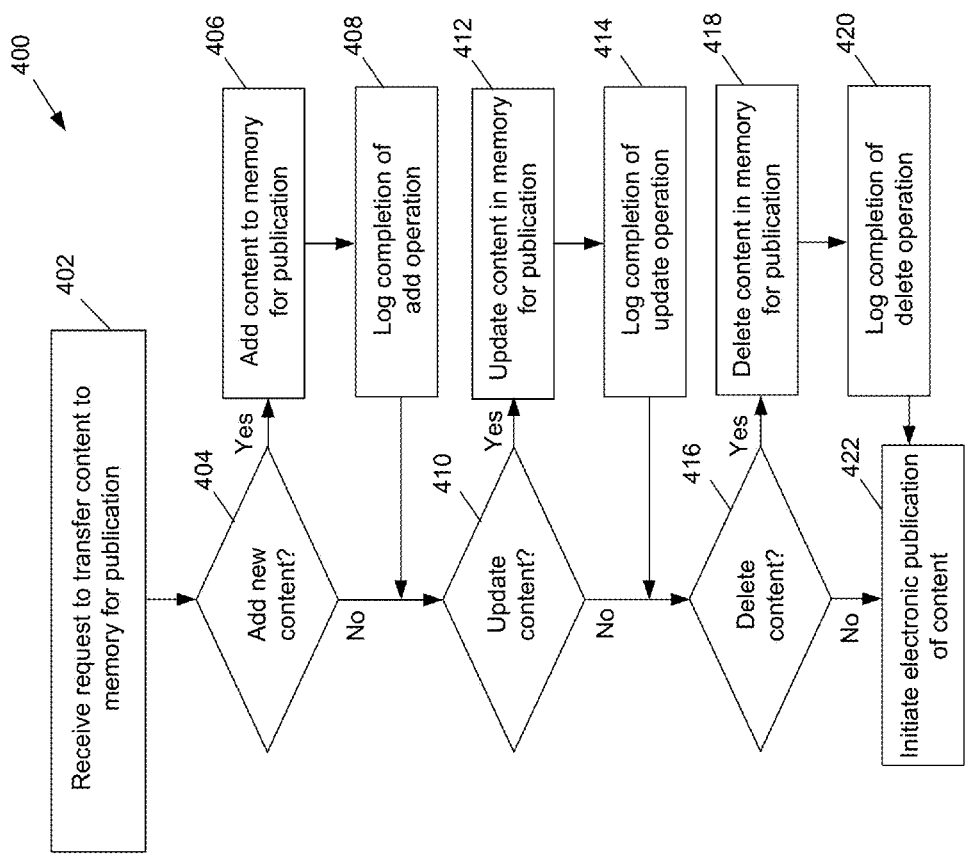

Referring to FIG. 4, a flowchart 400 represents additional operations of the content manager 226 (shown in FIG. 2). As described above, once stored and prepared for transferring to memory (e.g., the user memory 224) for publishing, the content manager 226 may receive 402 a request to transfer the content to memory for publication. In some arrangements, the request may be triggered when the content is prepared for transfer (e.g., put into an appropriate format), or, in other arrangements the request may be triggered by user input to initiate publication.

Various types of operations may be executed to transfer content from the staging memory 220 to the appropriate memory for electronic publication (e.g., the user memory 224). For example, operations may include determining 404 if content needs to be added to the memory for publication.

Along with adding 406 the appropriate content, update blocking of the content is removed upon transferring the content to the memory for publication (e.g., the user memory 224). Additionally, completion of the add operation is logged 408 so that the operation is not executed again in the event of an interruption and subsequent re-establishment of processing operations.

Transfer operations may also include determining 410 if content needs to be updated in the memory for publication. For example, as mentioned above, content stored in the staging memory 220 may be compared to the appropriate content stored in the user memory 224 to determine what content, if any, needs to be updated. Along with updating 412 the appropriate content, the update operation is logged 414 so reduce the probability of unnecessary re-execution of the update operation. Transfer operations may also include determining 416 if content present in the memory for publication needs to be deleted. For example, if content has been removed from the staging memory 220, corresponding content may be removed from the content present in the user memory 224. If content needs to be deleted, operations of the content manager 226 include deleting 418 the appropriate content and logging 420 the completion of the deletion operation. As mentioned above, logging the completion of an operation may include storing information to represent that the operation has been completed, removing information from a list of operations (that represents operation to be completed), or similar operation. Upon completing the possible adjustments to the content stored in the memory for publication, operations of the content manager may include initiating 422 electronic publication of the content (e.g., stored in the user memory 224).

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

Other embodiments are within the scope of the following claims. The techniques described herein can be performed in a different order and still achieve desirable results.

What is claimed is:

1. A method comprising:
   receiving, at a server and from one or more electronic devices over network connections, multimedia content associated with a user account, wherein the received multimedia content is designated for electronic publication;
   storing, by the server, the received multimedia content in a staging memory coupled to the server, wherein the staging memory is separate from a user memory that is coupled to the server and associated with the user account;
   blocking, by the server, updating the multimedia content stored in the staging memory;
   determining, by the server, that the multimedia content is ready for publication; and
   in response to determining that the multimedia content is ready for publication, transferring, by the server, the multimedia content from the staging memory to the user memory for electronic publication of the multimedia content.

2. The method of claim 1, further comprising:
   publishing the multimedia content in one or more web-pages associated with the user account.

3. The method of claim 1, further comprising:
   enabling a user associated with the user account to access the multimedia content from the user memory coupled to the server.

4. The method of claim 1, wherein the received multimedia content stored in the staging memory include an updated version of a multimedia content that is present in the user memory, the method further comprising:
   updating the multimedia content present in the user memory using the updated version stored in the staging memory.

5. The method of claim 1, wherein receiving the multimedia content at the server comprises:

updating, at an electronic device associated with the user account, the multimedia content stored in the electronic device; and based on updating the multimedia content stored in the electronic device associated with the user account, sending a copy of the updated multimedia content from the electronic device associated with the user account to the server.

6. The method of claim 5, wherein sending the copy of the updated multimedia content to the server comprises:

retrieving, by the server, the copy of the updated multimedia content from the electronic device associated with the user account.

7. The method of claim 1, wherein receiving the multimedia content at the server comprises:

receiving, at the server and from the one or more electronic devices over the network connections, one or more of text, graphics, audio or video.

8. The method of claim 1, wherein the user memory is accessible by a user associated with the user account, while the staging memory is inaccessible to the user.

9. The method of claim 1, wherein receiving the multimedia content associated with the user account comprises receiving the multimedia content for storage in the user memory associated with the user account.

10. The method of claim 1, wherein receiving the multimedia content from one or more electronic devices over network connections comprises:

receiving, at the server, the multimedia content from one or more electronic devices associated with the user account.

11. The method of claim 1, wherein the multimedia content is comprised of portions of content received from the one or more electronic devices, the portions of content stored in the staging memory.

12. The method of claim 11, wherein determining that the multimedia content is ready for publication comprises determining that each of the portions of content stored in the staging memory are assembled into the multimedia content.

13. The method of claim 1, further comprising:

comparing the multimedia content stored in the staging memory to multimedia content stored in the user memory;

determining that portions of the multimedia content stored in the staging memory are absent from the user memory; and in response to the determining, transferring from the staging memory to the user memory the portions of the multimedia content stored in the staging memory that are absent from the user memory.

14. The method of claim 1, further comprising:

comparing the multimedia content stored in the staging memory to multimedia content stored in the user memory;

determining that portions of the multimedia content stored in the user memory are absent from the staging memory; and in response to the determining, deleting from the user memory the portions of the multimedia content that are stored in the user memory but absent from the staging memory.

15. The method of claim 1, wherein the multimedia content is comprised of portions of content stored in the staging memory, the method further comprising:

computing a period of time for which the portions of content have been stored in the staging memory;

determining whether the period of time has exceeded a particular time limit; and in response to determining that the period of time has exceeded the particular time limit, deleting the portions of content stored in the staging memory.

16. The method of claim 1, wherein the multimedia content is comprised of portions of content stored in the staging memory, and wherein blocking the updating comprises one of:

removing information from the portions of content that can allow the updating to occur, or implementing write protection techniques or privilege assignments to the portions of content stored in the staging memory.

17. The method of claim 1, wherein the multimedia content is comprised of portions of content stored in the staging memory, and wherein transferring the multimedia content from the staging memory to the user memory comprises:

removing restrictions associated with blocking updates that were placed on the portions of content stored in the staging memory when the multimedia content is transferred to the user memory.

18. A system comprising:

one or more processors; and instructions stored in machine-readable medium for execution by the one or more processors and, when executed, configured to cause the one or more processors to perform operations comprising:

receiving, at a server and from one or more electronic devices over network connections, multimedia content associated with a user account, wherein the received multimedia content is designated for electronic publication;

storing, by the server, the received multimedia content in a staging memory coupled to the server, wherein the staging memory is separate from a user memory that is coupled to the server and associated with the user account;

blocking, by the server, updating the multimedia content stored in the staging memory;

determining, by the server, that the multimedia content is ready for publication; and in response to determining that the multimedia content is ready for publication, transferring, by the server, the multimedia content from the staging memory to the user memory for electronic publication of the multimedia content.

19. The system of claim 18, wherein the instructions are configured to cause the one or more processors to perform operations further comprising:

publishing the multimedia content in one or more webpages associated with the user account.

20. The system of claim 18, wherein the instructions are configured to cause the one or more processors to perform operations further comprising:

enabling a user associated with the user account to access the multimedia content from the user memory coupled to the server.

21. The system of claim 18, wherein the received multimedia content stored in the staging memory include an updated version of a multimedia content that is present in the user memory, the instructions configured to cause the one or more processors to perform operations further comprising:

updating the multimedia content present in the user memory using the updated version stored in the staging memory.

22. The system of claim 18, wherein receiving the multimedia content at the server comprises:
- updating, at an electronic device associated with the user account, the multimedia content stored in the electronic device; and
- based on updating the multimedia content stored in the electronic device associated with the user account, sending a copy of the updated multimedia content from the electronic device associated with the user account to the server.

23. The system of claim 22, wherein sending the copy of the updated multimedia content to the server comprises:
- retrieving, by the server, the copy of the updated multimedia content from the electronic device associated with the user account.

24. The system of claim 18, wherein receiving the multimedia content at the server comprises:
- receiving, at the server and from the one or more electronic devices over the network connections, one or more of text, graphics, audio or video.

25. The system of claim 18, wherein the multimedia content is comprised of portions of content received from the one or more electronic devices, the portions of content stored in the staging memory.

26. The system of claim 17, wherein determining that the multimedia content is ready for publication comprises determining that each of the portions of content stored in the staging memory are assembled into the multimedia content.

27. The system of claim 18, wherein the operations further comprise:
- comparing the multimedia content stored in the staging memory to multimedia content stored in the user memory;
- determining that portions of the multimedia content stored in the staging memory are absent from the user memory; and
- in response to the determining, transferring from the staging memory to the user memory the portions of the multimedia content stored in the staging memory that are absent from the user memory.

28. The system of claim 18, wherein the operations further comprise:
- comparing the multimedia content stored in the staging memory to multimedia content stored in the user memory;
- determining that portions of the multimedia content stored in the user memory are absent from the staging memory; and
- in response to the determining, deleting from the user memory the portions of the multimedia content that are stored in the user memory but absent from the staging memory.

29. The system of claim 18, wherein the multimedia content is comprised of portions of content stored in the staging memory, the operations further comprising:
- computing a period of time for which the portions of content have been stored in the staging memory;
- determining whether the period of time has exceeded a particular time limit; and
- in response to determining that the period of time has exceeded the particular time limit, deleting the portions of content stored in the staging memory.

30. The system of claim 18, wherein the multimedia content is comprised of portions of content stored in the staging memory, and wherein blocking the updating comprises one of:
- removing information from the portions of content that can allow the updating to occur, or
- implementing write protection techniques or privilege assignments to the portions of content stored in the staging memory.

31. The system of claim 18, wherein the multimedia content is comprised of portions of content stored in the staging memory, and wherein transferring the multimedia content from the staging memory to the user memory comprises:
- removing restrictions associated with blocking updates that were placed on the portions of content stored in the staging memory when the multimedia content is transferred to the user memory.

32. A non-transitory machine-readable medium storing instructions that, when executed by one or more processors, are configured to cause the one or more processors to perform operations comprising:
- receiving, at a server and from one or more electronic devices over network connections, multimedia content associated with a user account, wherein the received multimedia content is designated for electronic publication;
- storing, by the server, the received multimedia content in a staging memory coupled to the server, wherein the staging memory is separate from a user memory that is coupled to the server and associated with the user account;
- blocking, by the server, updating the multimedia content stored in the staging memory;
- determining, by the server, that the multimedia content is ready for publication; and
- in response to determining that the multimedia content is ready for publication, transferring, by the server, the multimedia content from the staging memory to the user memory for electronic publication of the multimedia content.

33. The non-transitory machine-readable medium of claim 32, wherein the instructions are configured to cause the one or more processors to perform operations further comprising:
- publishing the multimedia content in one or more webpages associated with the user account.

34. The non-transitory machine-readable medium of claim 32, wherein the instructions are configured to cause the one or more processors to perform operations further comprising:
- enabling a user associated with the user account to access the multimedia content from the user memory coupled to the server.

35. The non-transitory machine-readable medium of claim 32, wherein the received multimedia content stored in the staging memory include an updated version of a multimedia content that is present in the user memory, the instructions configured to cause the one or more processors to perform operations further comprising:
- updating the multimedia content present in the user memory using the updated version stored in the staging memory.

36. The non-transitory machine-readable medium of claim 32, wherein receiving the multimedia content at the server comprises:
- updating, at an electronic device associated with the user account, the multimedia content stored in the electronic device; and
- based on updating the multimedia content stored in the electronic device associated with the user account, sending a copy of the updated multimedia content from the electronic device associated with the user account to the server.

37. The non-transitory machine-readable medium of claim 36, wherein sending the copy of the updated multimedia content to the server comprises:
retrieving, by the server, the copy of the updated multimedia content from the electronic device associated with the user account.

38. The non-transitory machine-readable medium of claim 32, wherein receiving the multimedia content at the server comprises:
receiving, at the server and from the one or more electronic devices over the network connections, one or more of text, graphics, audio or video.

39. The non-transitory machine-readable medium of claim 32, wherein the multimedia content is comprised of portions of content received from the one or more electronic devices, the portions of content stored in the staging memory.

40. The non-transitory machine-readable medium of claim 39, wherein determining that the multimedia content is ready for publication comprises determining that each of the portions of content stored in the staging memory are assembled into the multimedia content.

41. The non-transitory machine-readable medium of claim 32, wherein the operations further comprise:
comparing the multimedia content stored in the staging memory to multimedia content stored in the user memory;
determining that portions of the multimedia content stored in the staging memory are absent from the user memory; and
in response to the determining, transferring from the staging memory to the user memory the portions of the multimedia content stored in the staging memory that are absent from the user memory.

42. The non-transitory machine-readable medium of claim 32, wherein the operations further comprise:
comparing the multimedia content stored in the staging memory to multimedia content stored in the user memory;
determining that portions of the multimedia content stored in the user memory are absent from the staging memory; and
in response to the determining, deleting from the user memory the portions of the multimedia content that are stored in the user memory but absent from the staging memory.

43. The non-transitory machine-readable medium of claim 32, wherein the multimedia content is comprised of portions of content stored in the staging memory, the operations further comprising:
computing a period of time for which the portions of content have been stored in the staging memory;
determining whether the period of time has exceeded a particular time limit; and
in response to determining that the period of time has exceeded the particular time limit, deleting the portions of content stored in the staging memory.

44. The non-transitory machine-readable medium of claim 32, wherein the multimedia content is comprised of portions of content stored in the staging memory, and wherein blocking the updating comprises one of:
removing information from the portions of content that can allow the updating to occur, or
implementing write protection techniques or privilege assignments to the portions of content stored in the staging memory.

45. The non-transitory machine-readable medium of claim 32, wherein the multimedia content is comprised of portions of content stored in the staging memory, and wherein transferring the multimedia content from the staging memory to the user memory comprises:
removing restrictions associated with blocking updates that were placed on the portions of content stored in the staging memory when the multimedia content is transferred to the user memory.

\* \* \* \* \*